Feb. 22, 1966            N. R. L. QUINN            3,236,311
VERTICAL LIFT POWER PLANTS FOR AIRCRAFT
Filed Sept. 23, 1963
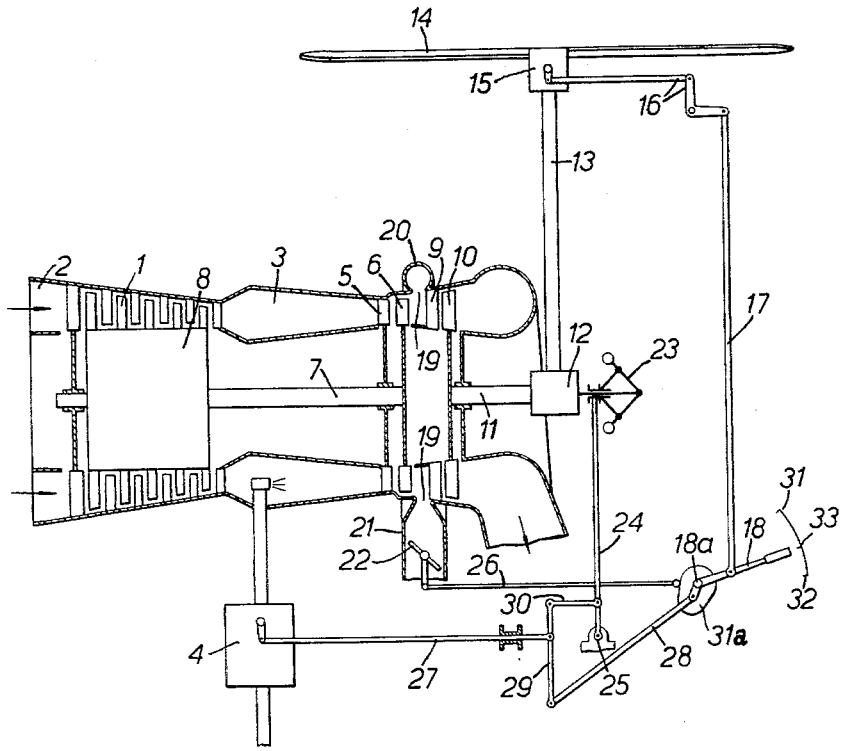
INVENTOR
NEVILLE R. L. QUINN
BY
ATTORNEYS

# United States Patent Office 3,236,311
Patented Feb. 22, 1966

3,236,311
VERTICAL LIFT POWER PLANTS FOR AIRCRAFT
Neville Raymond Lloyd Quinn, Filton, Bristol, England, assignor to Bristol Siddeley Engines Limited, Bristol, England, a company of Great Britain
Filed Sept. 23, 1963, Ser. No. 310,761
Claims priority, application Great Britain, Oct. 1, 1962, 37,184/62
2 Claims. (Cl. 170—135.74)

This invention relates to power plants of the gas turbine type and of the kind including a power gas producer comprising an air compressor arranged to deliver air to a combustion chamber or chambers and a turbine rotor arranged to be acted upon by the products of combustion from a combustion chamber or chambers and to drive the compressor, and a further turbine rotor (hereinafter for convenience called the free power turbine rotor) on which the products of combustion act after they have acted upon the turbine rotor of the power gas producer, the free power turbine rotor being arranged to drive the apparatus to which power is to be delivered by the power plant, for example a bladed air displacement rotor arranged to apply an upward and/or horizontal thrust to an aircraft to which the power plant is fitted.

The invention is concerned with power plants of the above general kind in which it will be understood that control means are provided for varying the fuel supply to the combustion chamber or chambers in accordance with variations in the power required from the free turbine rotor. Such control means may moreover in some cases be partly or wholly automatic, for example where the free turbine rotor of a power plant of the kind referred to drives an air displacement rotor arranged to exert a lifting force upon an aircraft in which the power plant is installed and pilot-operated control apparatus is provided by which the air displacement characteristics of the air displacement rotor can be varied to control the upward reaction, with consequent variations in the demand for power from the free power turbine rotor, the power plant usually includes automatic control means for increasing the fuel supply to the combustion chamber or chambers in response to reductions in the speed of the air displacement rotor and vice versa so as to tend to prevent or restrict variations in the speed of the air displacement rotor.

In such applications of a power plant of the kind referred to, the automatic control means of the fuel supply system reduces fuel supply to the power gas producer as a result of the tendency for the free power turbine rotor to overspeed due to the reduction in the power required from it during a descent of the aircraft with a result that the speed of the rotor of the gas producer may fall to a value such that if, in order to make a quick recovery from the descent, the pilot suddenly adjusts the air displacement characteristics of the air displacement rotor, with a consequent sudden increase in the demand for power from the free power turbine rotor, the response may be too slow owing to the small mass flow through and correspondingly low speed of the rotor assembly of the gas producer so that a substantial fall occurs in the speed of the air displacement rotor.

According to the present invention a power plant of the kind referred to includes valve apparatus by which a proportion of the products of combustion can be discharged from a point between the gas producer turbine and the free power turbine freely to the atmosphere, that is to say discharged without performing any appreciable useful work, and valve operating mechanism by which the valve apparatus is automatically operated in dependence upon the operating conditions of the power plant so that, when the demand for power from the free power turbine rotor is small, the valve apparatus will automatically be caused to occupy a position permitting flow of a substantial proportion of the total products of combustion from the gas producer freely to the atmosphere while the valve apparatus will be automatically closed or partially closed so as to make available a substantially immediate substantial increase in the mass flow through the free power turbine rotor if and when there is movement of a manual control representing a sudden call for extra power from the free power turbine.

Thus the valve operating mechanism in a power plant according to the invention will be so constructed and arranged as automatically to control the valve apparatus over the appropriate part of the total power range of the free power turbine in such manner as to prevent the rotor speed of the gas producer dropping with reductions in the power required over said part of its power range to a value such that a rapid substantial increase in power cannot be obtained.

Thus in one arrangement according to the invention as applied to a power plant in which the free power turbine rotor drives an air displacement rotor arranged to exert a lifting force on an aircraft as above mentioned, the valve operating mechanism is arranged to be operated in coordination with the pilot's manual control by which he controls the lift characteristics of the air displacement rotor so as to maintain such valve apparatus open when the pilot's control occupies a range of positions corresponding to descending flight.

One form of the invention is shown diagrammatically by way of example in the accompanying drawing, as applied to a power plant of the kind in question in which the free power turbine rotor is arranged to drive an air displacement rotor for applying lift to an aircraft, e.g. a bladed rotor constituting the rotary wing system of a helicopter, the pitch of the blades being adjustable in conventional manner by the pilot to vary the air displacement characteristics of the rotor and hence the lifting force applied by it to the aircraft.

In the drawing,

The one figure is a diagrammatic side elevation of one example of the invention with the gas producer and free power turbine shown in cross section in a plane containing the axis of rotation of their rotors.

In the construction shown in the accompanying drawing the power plant comprises a power gas producer consisting of an axial flow air compressor 1 arranged to draw air from an air inlet 2 and deliver it to combustion chambers 3 arranged to be supplied with fuel by fuel supply apparatus 4, the products of combustion from the combustion chambers 3 being delivered through a fixed nozzle ring 5 so as to act first upon the blades of a turbine rotor 6 which is connected by a shaft 7 to the rotor 8 of the compressor 1 and then to be directed by a second nozzle ring or set of stator blades 9 onto the blades of a turbine rotor 10 constituting a free power turbine rotor. The free power turbine rotor 10 is coupled by way of its shaft 11 and gearing indicated at 12 to the shaft 13 of a rotor 14 constituting a rotary wing system having blade pitch control mechanism indicated at 15 under the control, through a linkage and lever system generally indicated at 16, and a control rod 17, of the pilot's collective pitch control lever 18.

Bleed openings 19 are formed in the casing of the power gas producer at a point between the rotor blades 6 and the stator blades 9, these bleed openings leading into a manifold 20 having an outlet pipe 21 containing a control valve 22, gas passing through the control valve 22 being discharged freely to the atmosphere without performing any appreciable useful work. Connected to the shaft 11 of the free power turbine rotor 10 is a speed-responsive governor 23 arranged to act upon one end of a lever 24 pivoted at 25. The valve 22 is arranged to be opened and closed by a rod indicated at 26 while the fuel supply apparatus 4 is controlled by a rod 27.

The pilot's collective pitch control lever 18, in addition to controlling the pitch of the rotary wing system 14 by way of the control rod 17 and lever and linkage 16, is arranged to act through a rod 28 on one end of a floating lever 29 the other end of which is connected by a link 30 to the governor lever 24, while the rod 27 is connected to an intermediate point in the lever 29. The pilot's collective pitch control lever 18, which is mounted to pivot about an axis 18a, also carries a cam 31a which is arranged to act on the rod 26. The collective pitch control lever 18 has a range of movement from a position 31 representing maximum pitch to a position 32 representing minimum pitch and the arrangement is such that on any movement of the lever 18 within this range, the rod 28, acting through the lever 29 and the rod 27 provides an instantaneous change in the fuel supply, but probably not to the exact degree which the change in blade pitch thus effected requires to maintain the speed of the rotor 14 constant. Thus at each position of the lever 18 the governor 23 acts through the lever 24, the link 30 and the rod 27 to control the fuel supply 4 in a manner such as to provide any correction required to maintain the rotational speed of the rotor 14 approximately constant, and the purpose of the interconnection 28 and 29 with the rod 27 is to reduce or substantially eliminate the lag which would otherwise occur between movement of the level 18 and the required adjustment of the fuel supply by the governor 23. The form of the cam 31a is such that for that part of the total range of movement of the lever 18 over which the pitch of the rotor blades 14 is above a predetermined value, i.e. between the points 31 and 33, the valve 22 is maintained closed whereas over the part of the range of movement of the lever 18 between the points 33 and 32 the cam 31a maintains the valve 22 open to a greater or less extent depending on the position of the lever 18, the valve being progressively opened with movement of the lever 18 from the position 33 to the position 32, so as to allow for a progressive escape of working fluid direct to the atmosphere from the manifold 20.

It will be apparent that with a reduction in the pitch of the blades of the rotor 14 the speed of the turbine and compressor rotors 6 and 8 of the power gas producer will fall correspondingly since the speed of the rotor 14 is kept approximately constant by the governor 23 and when the demand for power by the rotor 14 is reduced, therefore, the governor will reduce the fuel supply to the combustion chambers 3. Assuming that the collective pitch control lever is being moved away from the position 31 it may be assumed that when the lever reaches the position 33 the power required for driving the rotor 14 has fallen just below that required to maintain the aircraft in level flight at, say, a thousand feet above sea level, this power being somewhat below that required to retain the aircraft in hovering flight at constant altitude. On further movement of the collective pitch lever 18 towards the position 32 therefore the valve 22 is progressively opened and this prevents any significant fall-off in the speed of the turbine and compressor rotor 6, 8, or may even cause a slight rise in this speed, thus ensuring that, should a rapid increase in power be required due to the pilot moving the lever 18 back towards the position 32, the closing of the valve 22 will make available immediately the required increased mass flow through the free power turbine 9, 10 without the lag which would occur if, during the period of low power demand, the speed of the turbine and compressor rotor 6, 8 had fallen to that at which the mass flow was that required to drive the free power turbine 10 and no more.

In alternative applications of the invention, it may be applied to power plants of the kind in question in which the free power turbine drives a so-called lift fan, as by constituting part of a lift fan assembly, the air displacement characteristics of which are controllable, for example by varying the pitch of the stator and/or rotor blades of the fan. Moreover, the invention may also be applied to arrangements such as those shown, for example, in the specification of British Patents Nos. 846,300 and 826,963 in which products of combustion from a power gas producer can be distributed in various proportions between one or more jets and one or more lift fans. In either of the above cases the valve apparatus would be arranged so that under suitable conditions of low power demand from the lift fan or fans it would permit a proportion of the products of combustion from the power gas producer to be discharged freely to the atmosphere as by providing an interconnection in between a valve controlling the free discharge to atmosphere and a control member by which the operating conditions of the power plant are controlled.

What I claim as my invention and desire to secure by Letters Patent is:

1. A helicopter rotor and power plant system comprising a power gas producer including combustion chamber means, an air compressor arranged to deliver air to said combustion chamber means, and a turbine rotor arranged to be acted upon by the products of combustion from the combustion chamber means and to drive the compressor, and a further turbine rotor constituting a free power turbine rotor on which the products of combustion act after they have acted upon the turbine rotor of the gas producer, at least one helicopter rotor having adjustable blades, power transmission means arranged to transmit power from said free power turbine rotor to said helicopter rotor, control apparatus for said power plant including means for controlling automatically the fuel supply to the combustion chamber means in accordance with the power output required from the free power turbine rotor in such manner as to maintain the speed of the free power turbine rotor and hence of the helicopter rotor substantially constant, pilot-operated control means for varying the collective pitch of the blades of said helicopter rotor over a range of pitch positions, valve means between the gas producer turbine rotor and the free power turbine rotor by which a proportion of the products of combustion can be discharged freely to the atmosphere thereby performing no appreciable useful work and valve operating mechanism comprising an interconnection means between the pilot-operated control means and the valve means for varying the degree of opening of the valve means, said valve means being automatically progressively opened in response to the movement of the pilot-operated control means in the direction to decrease the collective pitch of said helicopter rotor during which there is a decrease in demand for power for driving the helicopter rotor and being progressively closed in response to movement of said pilot-operated means.

2. A power plant of the gas turbine type as claimed in claim 1 wherein the interconnection means between the pilot-operated control means and the valve means is such that the valve means remains in its closed position for that part of the range of movement of the pilot-operated control means corresponding to relatively large pitch positions during which there is a demand for substantial power, said valve means being progressively opened only over that part of the range of movement of the pilot-operated control means corresponding to relatively small pitch positions during which there is a demand for relatively little or no power.

References Cited by the Examiner

UNITED STATES PATENTS

| | | | |
|---|---|---|---|
| 2,742,760 | 4/1956 | Hodge | 60—39.16 |
| 2,755,621 | 7/1956 | Terrell | 60—39.16 |
| 2,861,638 | 11/1958 | Grosselfinger | 170—135.73 |
| 2,991,618 | 7/1961 | Marscher et al. | |
| 3,034,583 | 5/1962 | Best | 170—135.73 |

FOREIGN PATENTS

| | | |
|---|---|---|
| 505,563 | 9/1951 | Belgium. |
| 662,867 | 12/1951 | Great Britain. |
| 406,247 | 11/1943 | Italy. |
| 416,992 | 12/1946 | Italy. |
| 235,103 | 3/1945 | Switzerland. |

SAMUEL LEVINE, *Primary Examiner.*

JULIUS E. WEST, *Examiner.*

E. A. POWELL, JR., *Assistant Examiner.*